United States Patent [19]
Roddy et al.

[11] Patent Number: 6,056,847
[45] Date of Patent: May 2, 2000

[54] METHOD AND KIT FOR APPLYING SOLVENT TO THE MATRIX OF AN OPTICAL FIBER RIBBON

[75] Inventors: Rachel K. Roddy; Alfred L. Hinson, II, both of Hickory, N.C.

[73] Assignee: Alcatel, Paris, France

[21] Appl. No.: 09/109,142

[22] Filed: Jul. 2, 1998

[51] Int. Cl.[7] .................................................. B32B 35/00
[52] U.S. Cl. ........................... 156/344; 156/584; 81/9.4; 29/564.4
[58] Field of Search ................................... 156/344, 584; 81/9.4; 29/564.4; 7/107; 118/56

[56] References Cited

U.S. PATENT DOCUMENTS

| | | | |
|---|---|---|---|
| 3,642,564 | 2/1972 | Walker et al. | 161/145 |
| 3,853,576 | 12/1974 | Netznik | 117/5.5 |
| 3,871,935 | 3/1975 | Gloge et al. | 156/158 |
| 3,936,338 | 2/1976 | Gibson | 156/157 |
| 3,984,172 | 10/1976 | Miller | 350/96 B |
| 4,147,407 | 4/1979 | Eichenbaum et al. | 350/96.34 |
| 4,732,642 | 3/1988 | Ametani | 156/497 |
| 4,865,411 | 9/1989 | Darsey et al. | 350/96.21 |
| 5,006,190 | 4/1991 | Earle | 156/247 |
| 5,009,735 | 4/1991 | Ametani et al. | 156/241 |
| 5,098,459 | 3/1992 | Fukuma et al. | 65/4.21 |
| 5,277,730 | 1/1994 | Darsey et al. | 156/158 |
| 5,287,426 | 2/1994 | Shahid | 385/85 |
| 5,298,105 | 3/1994 | Dorsey | 156/584 |
| 5,460,683 | 10/1995 | Beasley, Jr. et al. | 156/344 |
| 5,481,638 | 1/1996 | Roll et al. | 81/9.4 X |
| 5,600,750 | 2/1997 | Beasley, Jr. et al. | 385/114 |
| 5,604,834 | 2/1997 | Beasley, Jr. et al. | 385/114 |
| 5,643,393 | 7/1997 | Genovese et al. | 156/344 |
| 5,681,417 | 10/1997 | Jacobs | 156/584 X |

FOREIGN PATENT DOCUMENTS

| | | |
|---|---|---|
| 279203 | 5/1987 | Japan . |
| 356609 | 3/1988 | Japan . |
| 200109 | 8/1988 | Japan . |
| 195603 | 12/1988 | Japan . |
| 294504 | 12/1988 | Japan . |
| 316804 | 12/1988 | Japan . |
| 2005005 | 1/1990 | Japan . |
| 153305 | 6/1990 | Japan . |
| 025005 | 11/1990 | Japan . |
| 310203 | 1/1991 | Japan . |
| 345287 | 2/1991 | Japan . |
| 3186806 | 8/1991 | Japan . |

*Primary Examiner*—Mark A. Osele
*Attorney, Agent, or Firm*—Ware, Fressola, Van Der Sluys & Adolphson LLP

[57] ABSTRACT

A method and kit for stripping the resin matrix on a predetermined length of optical fiber ribbon, allowing access over the length to the optical fibers of the optical fiber ribbon. A solvent is used to weaken the matrix material over the span to which access to the optical fibers is needed. Next the span is pressed onto a pressure sensitive adhesive and then pulled away from the pressure sensitive adhesive, leaving behind some or all of the matrix material. The process is repeated as necessary.

10 Claims, 3 Drawing Sheets

METHOD AND KIT FOR APPLYING SOLVENT TO THE MATRIX OF AN OPTICAL FIBER RIBBON

FIELD OF THE INVENTION

The present invention pertains to the field of optical fiber ribbon, and more particularly to a method and corresponding kit, suitable for use in the field, for accessing the optical fibers from the ribbon at an intermediate point along the ribbon.

BACKGROUND OF THE INVENTION

An optical fiber ribbon is a collection of several small optical fibers arranged side-by-side, all lying in a plane, encapsulated within a matrix made of a synthetic resin. This flat, side-by-side arrangement allows packing many optical fibers in a small cross-sectional area.

Sometimes one of the optical fibers in a ribbon needs to be repaired while the other fibers in the ribbon remain available to carry light signals. To repair a damaged optical fiber without disturbing any live fibers, the matrix must be removed from the optical fibers allowing access to the one or more fibers that must be repaired. Another, more frequent reason for accessing individual fibers in a ribbon is to splice one fiber to connect it to a piece of terminal equipment, leaving the other fibers intact until the ribbon is laid to another piece of terminal equipment. There is therefore a need to be able to remove the matrix from an optical fiber ribbon along a length of the ribbon not necessarily starting at an end of the ribbon.

Several methods have been developed of removing the matrix of an optical fiber ribbon for some interior span to access the individual fibers encapsulated by the ribbon matrix. These methods include cutting or scraping off the matrix, or partially cutting (scoring) the matrix, and then mechanically removing it from the fibers. All of these methods, it is found, are likely to cause damage to the optical fibers, and so are undesirable.

Another method involves shearing the matrix in some fashion, such as bending, tearing, pinching, or fatiguing it, to peel it away from the optical fibers. These methods mechanically disturb the fibers of the ribbon well beyond the region where access is required; this rearranging the fibers decreases the packing density, compared to what is possible with the fibers arranged in the ribbon as originally manufactured.

Another method uses adhesive tape and, optionally, a strong liquid adhesive. Here the section of the optical fiber ribbon bearing the optical fibers to be accessed is pressed onto an adhesive tape and then pulled off the tape, leaving behind at least some of the matrix from the span of ribbon to be stripped. Sometimes a strong liquid adhesive, such as a cyanoacrylate, is used with the tape. The strong liquid adhesive is applied at the point on the ribbon where entry is desired. That point on the ribbon is then pressed onto a surface adjacent the adhesive tape. Finally, the optical fiber ribbon is pulled up and away, the strong liquid adhesive ensuring that the matrix will tear and at least some will remain behind, adhered to the tape.

In this method, the prior art teaches using double-sided tape and a separate thin panel on which the strong liquid adhesive is deposited and to which the ribbon at the desired point of entry is glued. This method suffers from at least two drawbacks. First, there must be in the immediate vicinity a substantially flat and clean surface onto which the double-sided adhesive tape can be adhered. Second, since the panel on which the strong liquid adhesive is deposited will have some thickness, there will be a length of ribbon not adhered to the double-sided tape between where the ribbon is glued and where it first adheres to the tape. So when the ribbon is pulled away from where it is glued there will be a slight jerk, tending to remove the ribbon from the tape without further removing the matrix from the fibers. In addition, after removing the ribbon matrix from the fibers, the double-sided tape must be removed from the surface it was pressed onto. This residue of tape and matrix can be difficult to remove from the surface bearing the tape, making cleanup challenging.

Another method uses a solvent to soften or weaken the matrix material so that it falls away or is easily peeled away from the optical fibers. This method, however, tends to remove the coating of the optical fibers which is often color coded, and, in addition, often requires great patience. However, a method based on this approach could avoid mechanically stressing the optical fibers to be accessed. Yet the prior art based on this approach uses an abrasive scrub-pad to remove the matrix. Using a scrub-pad places stress on the optical fibers within the optical fiber ribbon, increasing the chance that a fiber will break as it ages or otherwise unacceptably degrade.

Solvent-based methods are discussed in U.S. Pat. No. 4,147,407 to Eichenbaum, which notes that the prior art teaches solvent stripping of the coating of a coated fiber or ribbon. Solvent-based methods are also discussed in U.S. Pat. No. 5,604,834 to Beasley, which teaches that efforts have been made to gain midspan entry by soaking optical ribbon fiber in a solvent gel and then wiping off the solvent matrix material with a rough pad or the like, but the shortcomings of this method make it commercially unacceptable; using a solvent is said to be messy, time-consuming, unreliable, limited to a relatively short region of midspan entry, and to discolor optical fibers.

For a solvent-based approach that would make possible access with less stress to the optical fibers, what is needed is a way to eliminate any abrasive scrubbing of the optical fiber and so reduce the chance that an optical fiber within the ribbon will be damaged. In addition, a method or kit based on using a solvent should allow a technician to observe the progress of the solvent in softening the matrix of the optical fiber ribbon, instead of working in the blind. This would allow the technician to remove the solvent from the optical fiber ribbon as soon as the solvent has softened the matrix enough for it to be removed, instead of possibly waiting so long that the solvent damages the encapsulated optical fibers. Finally, what is needed is a less messy way of using a solvent, so that when the solvent is applied to an optical fiber ribbon, the solvent will not likely drip off the optical fiber ribbon onto nearby optical fiber ribbons and soften the matrix of those ribbons.

SUMMARY OF THE INVENTION

The present invention is a method and kit for practicing the method for accessing optical fibers over some span, which may be an interior span, of an optical fiber ribbon based on softening the matrix of the optical fiber ribbon with a solvent. An object of the present invention is to reduce the likelihood that the solvent will not be removed before it damages the encapsulated optical fibers. A further object of the present invention is to reduce the likelihood that the solvent will drop off of the matrix onto nearby optical fiber ribbons and soften the matrix material of those optical fiber ribbons.

In the present invention, a solvent softens the matrix material so that it can be rubbed off with a (non-abrasive) tissue. Then any matrix remnants still clinging or adhered to the exposed optical fiber ribbons are removed by pressing the exposed optical fibers onto an adhesive coating on a plastic or rubber panel, and then pulling the optical fiber ribbon away from the adhesive to remove the matrix remnants.

A primary difficulty in using a solvent is overcome by the present invention through using a transparent holder, such as a plastic file tab holder, to hold the portion of the optical fiber ribbon matrix softening in the solvent. This allows a technician to observe the action of the solvent and to wipe the solvent off of the optical fiber ribbon portion as soon as the solvent appears to have sufficiently weakened the matrix.

BRIEF DESCRIPTION OF THE DRAWINGS

The above and other objects, features and advantages of the invention will become apparent from a consideration of the subsequent detailed description presented in connection with accompanying drawings, in which.

DESCRIPTION OF THE PREFERRED EMBODIMENT

Figure 1:
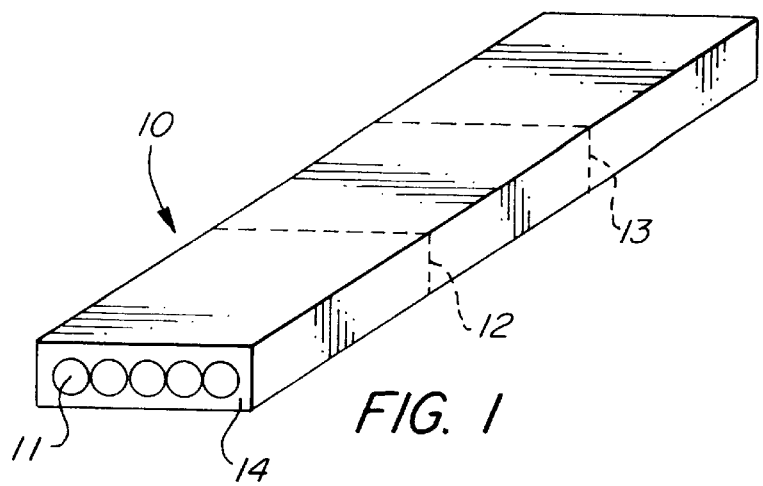
FIG. 1 is a perspective view of an optical fiber ribbon showing the optical fibers encapsulated by the matrix of the optical fiber ribbon.

Referring now to FIG. 1, an optical fiber ribbon 10 is shown having a matrix 14 encapsulating optical fiber ribbons 11. The present invention will allow removing a span of the matrix 14 of the optical fiber ribbon 10 between a starting location 12 and an ending location 13.

Figure 2:
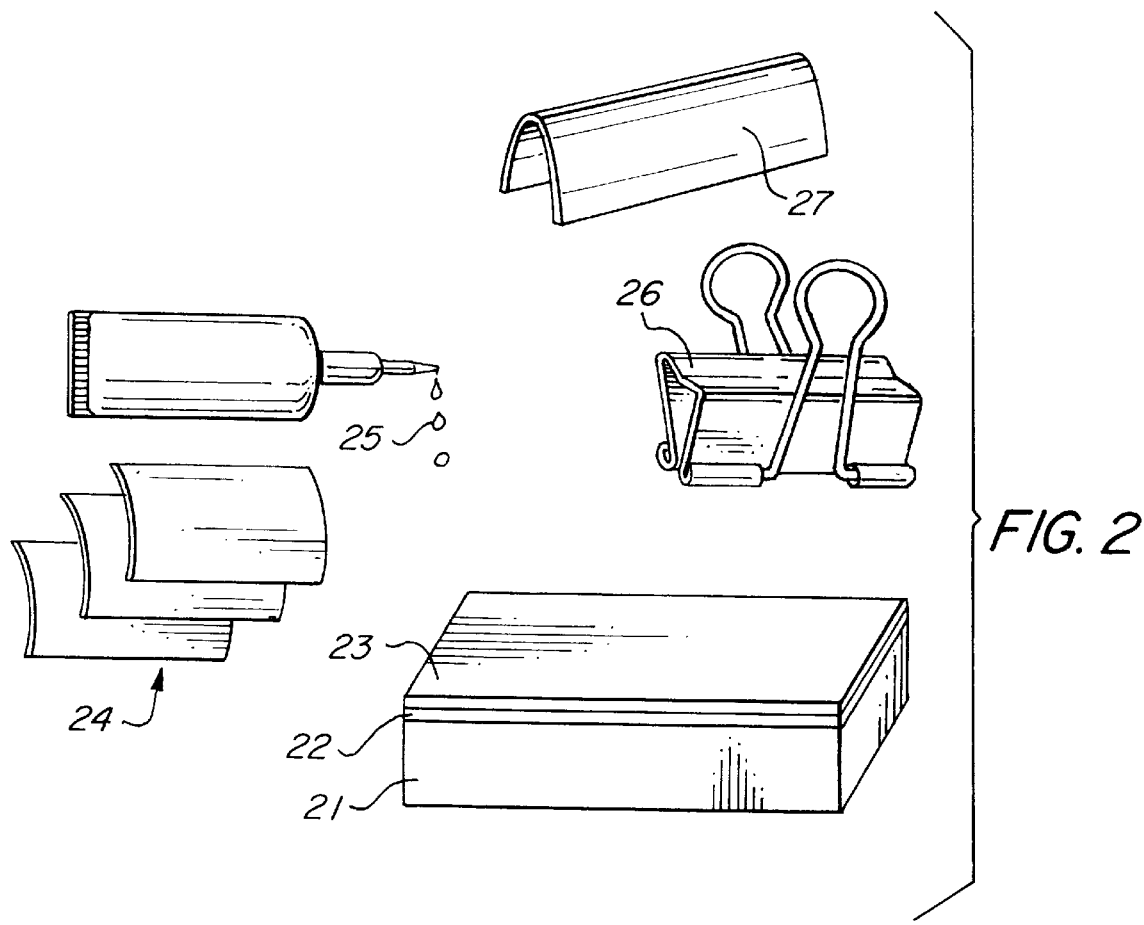
FIG. 2 is a perspective view of the components of a kit for performing the method of the present invention.

Referring now to FIG. 2, the elements of a kit for practicing the method of the present invention are shown. The kit includes a panel 21, made preferably of either a plastic material such as PVC, or a rubber material such as neoprene or nitrile, and covered on at least one surface by an adhesive coating 22, which is, preferably, a pressure sensitive adhesive that will adhere to the matrix material, but that, when adhered to an optical fiber will not adhere so strongly that the optical fiber is damaged if it is pulled away from the adhesive. The pressure sensitive adhesive is, preferably, an acrylate and, in particular, poly (2-octyl acrylate).

Preferably, the adhesive coating 22 on the panel is itself covered by silicone paper 23, which is then removed when the panel is put to use. The panel 21 is conveniently approximately six inches long and ¼-inch thick. The surface coated by the adhesive coating may be anywhere from ½ inch in extent allowing only a few applications, because of the adhesive coating wearing off after a few uses, to several inches in length. In using a panel with a wider adhesive-coated surface, only as much silicone paper is removed for an application as is needed for each application. The wider adhesive-coated surface offers the advantage that only a little silicone paper must be removed at a time, usually by scoring the paper with a razor blade type of knife.

The kit further includes a solvent 25, for softening a span of the matrix 14 of the optical fiber ribbon 10; a transparent holder 27 shaped to envelop an optical fiber ribbon and made of plastic, such as, for example, a plastic file tab holder, which is pre-formed in a folded-in-half shape, and, in the preferred embodiment is a two-inch long by 1-inch wide file tab holder, but can be longer or narrower, as needed, and can be cut to a size appropriate for any particular application; a fastener 26, such as a binder clip, preferably a small binder clip, for keeping the transparent holder 27 closed when the span of optical fiber ribbon bearing solvent is inside the transparent holder; and some non-abrasive cloth 24, which, in the preferred embodiment, is a supply of disposable sheets of non-abrasive cloth material.

The present invention is able to be used regardless of the length of the span of the matrix between the starting location 12 and ending location 13 by repeated application of the method if the length of the portion of the matrix 14 to be removed is longer than the length of the transparent holder 27, or by cutting down in length the transparent holder if the length of the portion of the matrix to be removed is shorter than the original length of the transparent holder.

Figure 3:
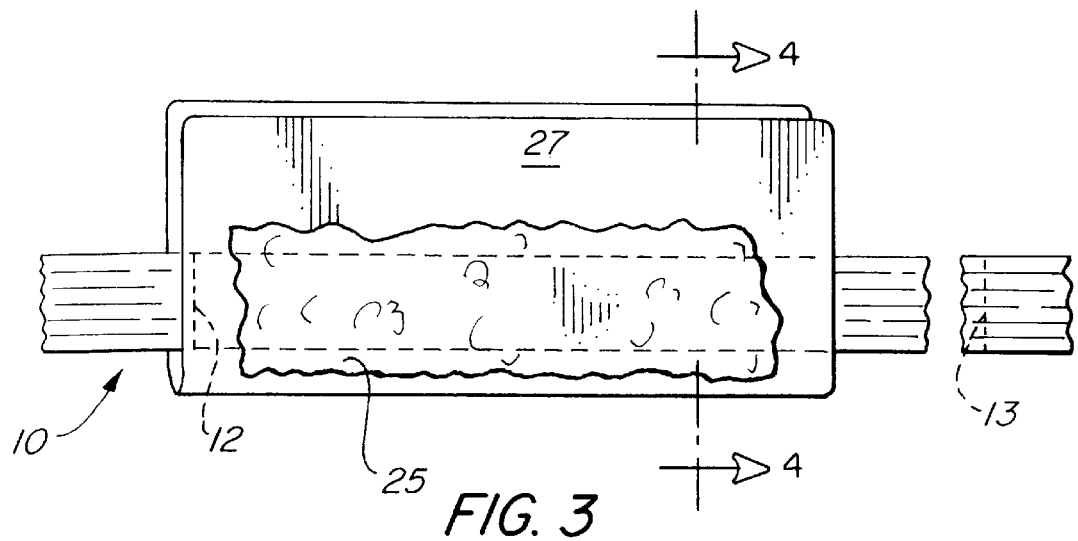
FIG. 3 is a side view of an optical fiber ribbon and solvent held by a holder according to the present invention.
Figure 4:
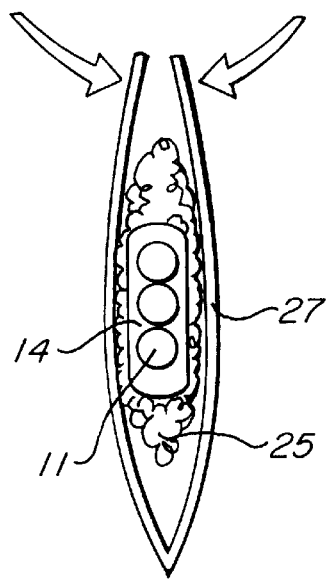
FIG. 4 is an end view corresponding to FIG. 3.

Referring now to FIG. 3 and 4, an optical fiber ribbon 10 is shown held by a transparent holder 27 so that the starting location 12 for removing the matrix 14 is located inside the transparent holder. In this situation, the span of matrix 14 to be removed is longer than the length of the transparent holder 27. Therefore, at this stage in the method according to the present invention, the ending location 13 lies outside of the transparent holder. The solvent 25 is shown enveloping the matrix 14, and the force applied to keep the transparent holder closed is shown by a pair of arrows at the open end of the transparent holder. The arrows indicate the point at which closing forces are applied, and the general direction of these forces. In the preferred embodiment, these forces are applied by a binder clip 26 (see FIG. 2).

Figure 5:
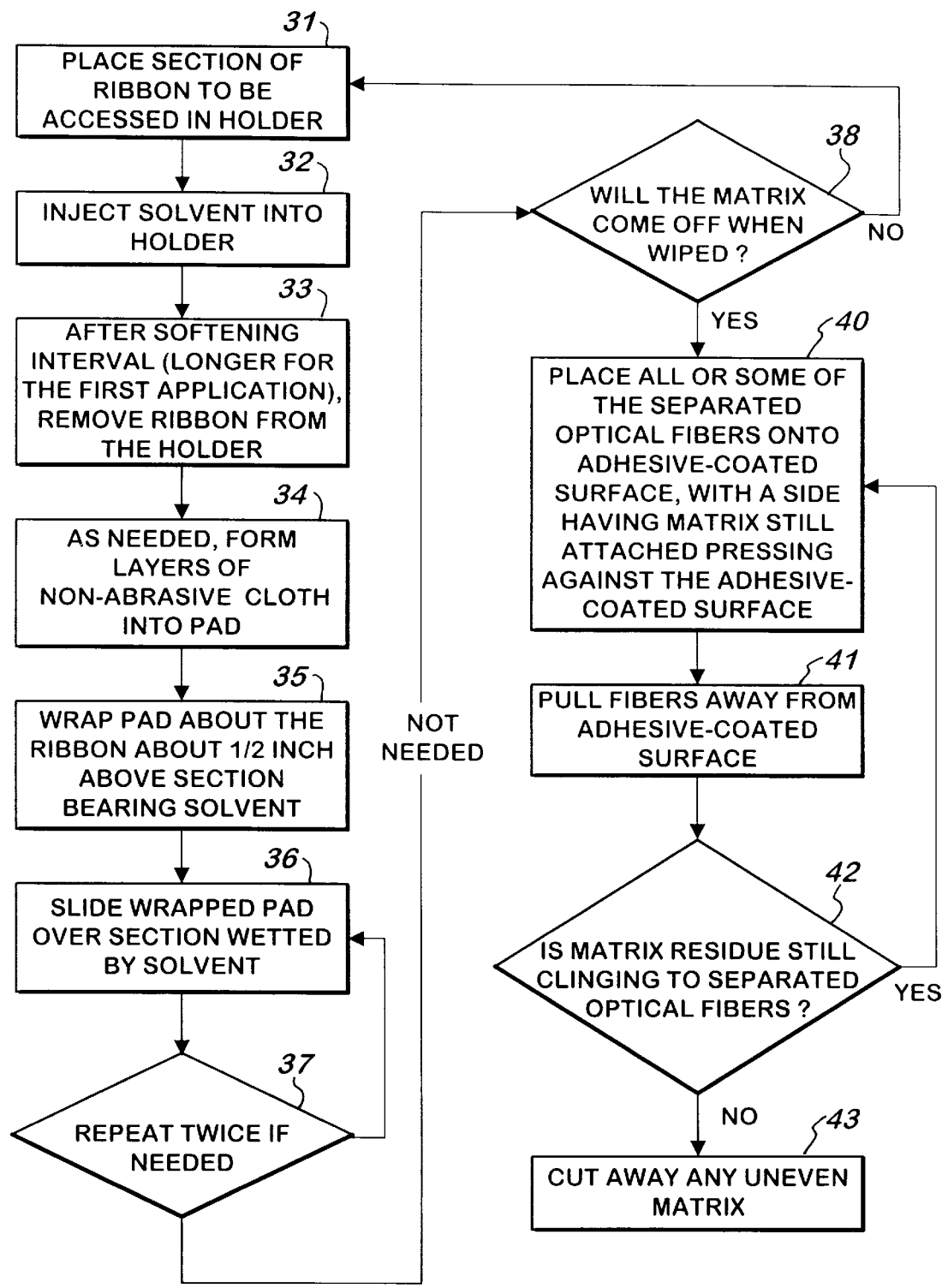
FIG. 5 is a flow diagram showing the steps of the method of the present invention.

Referring now to FIG. 5, the method of the present invention is represented as a flow diagram. In positioning step 31 of the method of the present invention, the transparent holder 27 is fitted over at least a portion on the matrix span to be removed from the optical fiber ribbon 11. If the transparent holder does not extend over the entire length of the span of the matrix 14 that must be removed, the method can be repeated until all of the needed matrix span is removed.

It is a good idea to place the optical fiber ribbon 10 on a dark work surface to more clearly see the progress of the work. In injecting step 32, a matrix removal solvent is carefully injected into the transparent holder 27 while it holds the optical fiber ribbon 10 somewhere between the starting location 12 and the ending location 13. It is usually the case that matrix material must be removed from an optical fiber ribbon only for a length of approximately one and half inches, which is the approximate length of some plastic file tab holders. If, however, the length of the optical fiber ribbon from which the matrix is to be removed is less than the length of the transparent holder 27, the transparent holder can be cut down in length. After injecting the matrix removal solvent into the transparent holder 27, the transparent holder is held closed with a fastener 26, such as a binder clip. In holding closed the transparent holder, the fastener should not press directly on the optical fiber ribbon within the transparent holder.

In removing step 33, after waiting for a softening interval to elapse, the optical fiber ribbon 10 is removed from the transparent folder 27; the technician should be sure to remove the optical fiber ribbon soon after the softening interval has elapsed, preferably within ten seconds after the softening interval has elapsed. The softening interval can have different values. On a first application of solvent to a span of optical fiber ribbon, the softening interval is approximately five to twelve minutes for the matrix to soften, or until bubbling of the solvent and matrix can be seen through the transparent holder 27. If a second application of solvent is needed on the same span of optical fiber ribbon, the softening interval is only approximately two minutes, or until bubbling is seen through the transparent holder.

In pad-forming step 34, a pad is formed from layers of non-abrasive cloth 24. To do this, three or four sheets of non-abrasive cloth can be twice folded in half. Then, in pad-wrapping step 35, the pad so formed is wrapped about the optical fiber ribbon 10 approximately one-half inch away from the section bearing solvent.

In another embodiment, which is preferred from the standpoint of ease of use, an approximately 0.010" thick, 4"×4" non-abrasive pre-formed cloth pad is used, instead of forming a pad from sheets of non-abrasive cloth. The pre-formed pad is a hydro-entangled cellulose polyester blend.

In sliding step 36, the pad wrapped about the optical fiber ribbon 10 is made to slide over the section of the optical fiber ribbon bearing solvent. To do this, it is helpful to grip the pad and optical fiber ribbon between the thumb and forefinger of one hand while gripping the remainder of the optical fiber ribbon with the other hand. In making the pad slide over the section bearing solvent, only moderate pressure should be applied to the pad.

It is usually necessary to slide the pad over the section of the optical fiber ribbon bearing solvent at least twice, as provided for in step 37. In matrix examination step 38, the optical fiber ribbon 10 is examined to determine whether to re-apply solvent to the same section. If some of the matrix has not come off after two or three sliding motions of the pad along the length of the section bearing solvent, the same section should be put back in the transparent holder and the process should be restarted according to positioning step 31, but the solvent should not be allowed to act for more than approximately two minutes in the second application, i.e. the technician should, in this instance, use the shortened softening interval of approximately two minutes.

After wiping the optical fiber ribbon 10 with the pad of non-abrasive cloth 24, in pressing step 40 the panel 21 is positioned beneath one side of the optical fiber ribbon 10 directly underneath the separated optical fibers 11, with the silicone paper 23 facing the optical fibers. The silicone paper is then removed from beneath the optical fibers, and the optical fibers are pressed against the adhesive-coated surface 22 of the panel 21. Only moderate pressure should be used in pressing the optical fibers down onto the adhesive surface.

In pulling step 41, the optical fiber ribbon 10 is pulled away from the panel 21, and as it moves away from the panel, it pulls the separated optical fibers away from the adhesive surface 22, leaving behind some or all of the matrix span residue that had adhered to the optical fibers 11.

In the second matrix residue examination step 42, the side of the optical fiber ribbon 10 just pressed onto the panel 21 is inspected for any remaining matrix 14 adhering to the optical fibers in the span to determine whether to repeat the steps beginning with pressing step 40. If residual matrix is found, then this pressing onto the adhesive surface 22 of the same side of the optical fiber ribbon 10 is repeated until all of the matrix 14 is removed from the side being pressed onto the panel 21. The optical fiber ribbon 10 can then be turned over and the matrix adhering to the other side of the optical fibers can be removed by repeating steps 40 through 42. When all of the matrix 14 has been removed from the optical fibers 11, in a final, cutting step, any dangling matrix material is cut away for easier access to the optical fibers 11.

In the present invention, the transparent holder 27 reduces the tendency of the solvent 25 to evaporate. The solvent and matrix 14 are held in close, confined contact by the transparent holder, helping to keep the solvent from evaporating. Thus, the present invention produces significantly lower levels of environmentally hazardous solvent fumes than other solvent-based methods of removing matrix from an optical fiber ribbon.

It is to be understood that the above-described arrangements are only illustrative of the application of the principles of the present invention. Obviously, for example, the present invention can be used to remove matrix from an end span of an optical fiber ribbon as well as from an interior span. Numerous other modifications and alternative arrangements may be devised by those skilled in the art without departing from the spirit and scope of the present invention, and the appended claims are intended to cover such modifications and arrangements.

What is claimed is:

1. A method of applying some solvent to a span of matrix of an optical fiber ribbon to soften the matrix in the span, the matrix of the optical fiber ribbon encapsulating optical fibers, the method comprising the steps of:

a) providing an optical fiber ribbon having a matrix that encapsulates at least one optical fiber and having a span from which the matrix is to be softened to provide access to the at least one encapsulated optical fiber;

b) providing a transparent holder having an interior;

c) placing at least a portion of the span inside the interior of the transparent holder; and d) injecting the solvent into the transparent holder interior so that it contacts at least a portion of the matrix of the span inside the transparent holder.

2. A method as claimed in claim 1, further comprising, after the step of injecting the matrix removal solvent into the transparent holder interior, the steps of:

e) holding the solvent and matrix together in the transparent holder for a softening interval, to provide a softened span of matrix;

f) wiping away at least some of the softened span of matrix with a non-abrasive cloth to provide at least partially exposed optical fibers; and g) removing any matrix residue by pressing the at least partially exposed optical fibers onto an adhesive-coated surface of a panel, and pulling the optical fiber ribbon away from the adhesive-coated surface to provide less residue-bearing optical fibers.

3. A method as claimed in claim 2, wherein the softening interval is approximately five to twelve minutes in a first application of the solvent to a particular span of optical fiber ribbon, and no longer than approximately two minutes in any subsequent application.

4. A kit for removing a span of matrix of an optical fiber ribbon, the matrix of the optical fiber ribbon encapsulating optical fibers, the kit comprising:

i) a transparent holder shaped to envelop an optical fiber ribbon;

ii) a supply of a matrix removal solvent; and iii) a supply of non-abrasive cloth.

5. A kit as claimed in claim 4, wherein the transparent holder is plastic pre-formed to bend in half and close on itself.

6. A kit as claimed in claim 5, wherein the supply of non-abrasive cloth is a supply of thin sheets of disposable non-abrasive cloth material.

7. A kit as claimed in claim 5, wherein the supply of non-abrasive cloth is a pre-formed pad of non-abrasive cloth material.

8. A kit as claimed in claim 5, further comprising a panel covered on at least one surface by an adhesive coating.

9. A kit as claimed in claim 5, wherein the adhesive is a pressure sensitive adhesive.

10. A kit as claimed in claim 9, wherein the pressure sensitive adhesive coating is itself covered by silicone paper, thereby providing a protective cover that can be removed without destroying the adhesive power of the pressure sensitive adhesive coating.

* * * * *